May 26, 1936. W. CZARNECKI 2,041,906
VALVE
Original Filed Dec. 24, 1934
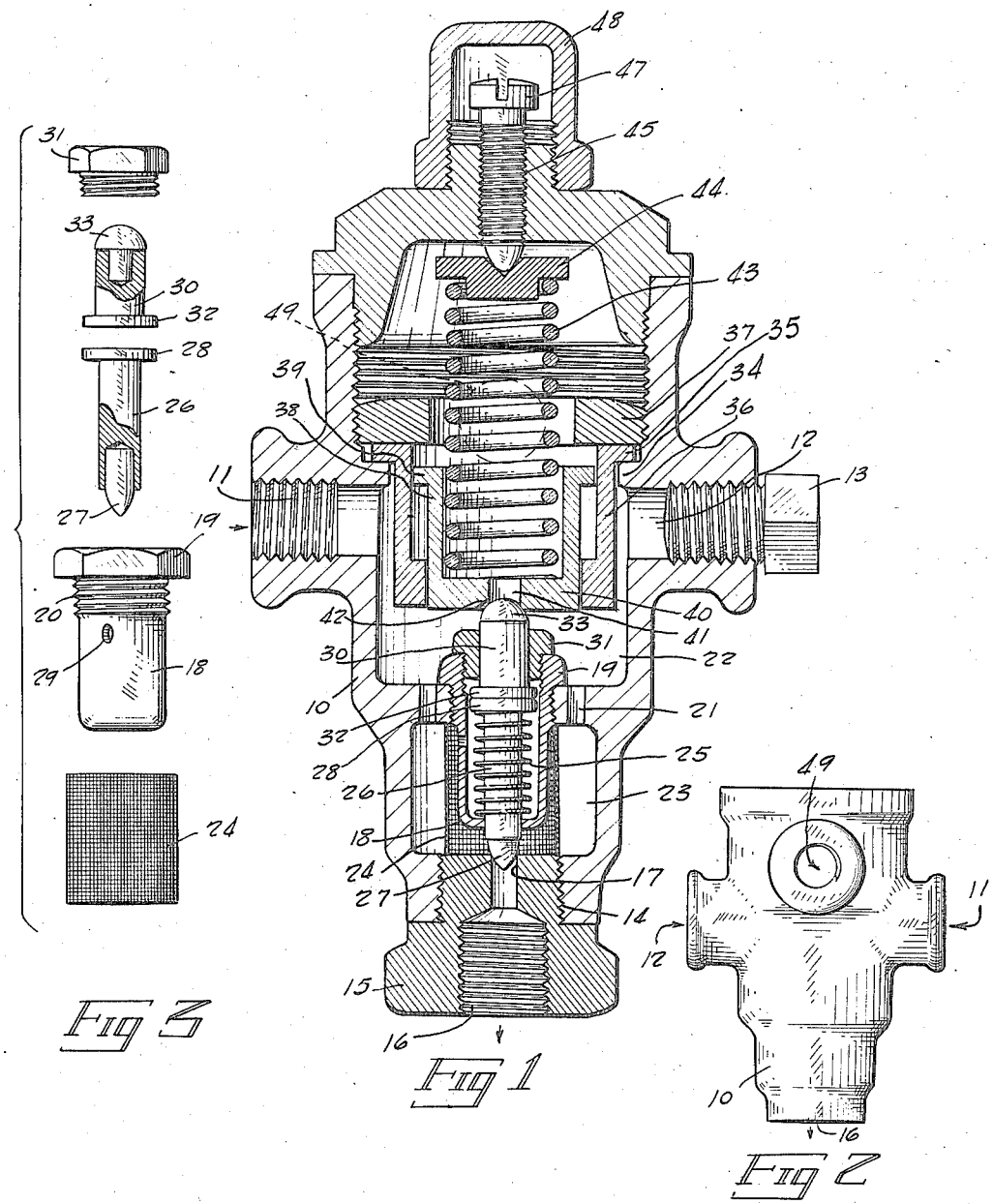

Patented May 26, 1936

2,041,906

UNITED STATES PATENT OFFICE 2,041,906

VALVE

Walter Czarnecki, Eddington, Pa., assignor to Eddington Metal Specialty Co., Eddington, Pa., a corporation of Pennsylvania Original application December 24, 1934, Serial No. 758,962. Divided and this application July 15, 1935, Serial No. 31,312

4 Claims. (Cl. 277—20)

This invention relates to the art of valves and is concerned primarily with the provision of valve elements designed for use in a pressure actuated valve.

This application is a division of my copending application filed December 24, 1934, for a "Relief valve", and bearing Serial No. 758,962.

In this co-pending application, there is illustrated and described a relief valve of the pressure actuated type which includes certain valve elements for controlling the passage of fluid through conduits, and this invention has in view, as its primary object, the provision of valve elements for this purpose of an improved design and construction.

The pressure actuated valve disclosed in the said co-pending application, includes a housing having inlet, outlet and by-pass ports, together with valve members controlling the passage of fluid through the by-pass and outlet ports, and the present invention comprises the particular design and construction of these valve members.

For a full and more complete understanding of the invention, reference may be had to the following description and accompanying drawing wherein:

Figure 1 is a view in section, taken through the pressure actuated relief valve of the said co-pending application, Figure 2 is a view in side elevation of the side housing, and Figure 3 is an exploded view of the various members making up the valve assembly.

For a detailed description of the structure and operation of the entire relief valve, reference is made to the specification and drawing of the said co-pending application. This structure is here briefly described as including a housing 10 having two aligned ports 11 and 12, either of which may be constituted the inlet port. In the illustrated embodiment, the port 11 is shown as the inlet port while the port 12 is closed by a plug 13. Obviously, a pressure gauge may take the place of the plug 13. At the lower extremity, the housing 10 is provided with a threaded opening designated 14 and in which is received a bushing 15 having a port 16 which normally is conductively connected to a burner or other device employing the fluid which is controlled by the valve.

The bushing 15 is formed with a valve seat at 17 and cooperating with this valve seat 17 is a valve assembly including the parts shown individually in Figure 3.

A valve sleeve 18 is formed with a non-circular head 19 for wrench engaging purposes and also with screw threads at 20 which are used in permanently seating the sleeve 18 in the housing 10. Formed in the latter, are a plurality of openings 21 which serve to establish communication between chambers 22 and 23 which are defined by the housing and it is noted that the chamber 23 surrounds the valve assembly. Positioned in this chamber 23 and about the sleeve 18 is a strainer 24 which is of a proper diametric dimension to be inserted prior to the assembly of the plug 13.

A spring 25 is positioned within the sleeve 18 and a valve member 26 is located within this coil spring 25. The valve member 26 is provided with a needle tip at 27 which, when in sealing position, is received in the valve seat 17. Ordinarily, this needle tip 27 will be of a material harder than that employed in the manufacture of the valve body and will, therefore, be identified as a separate piece which is received in the seat formed in the member 26. As shown in the drawing, this needle tip 27 is not conical but will be generated by the movement of an arc about the axis and the lines of any cross-section of this needle tip will therefore be arcuate.

The valve member 26 is formed with a head at 28 which engages one end of the spring 25. Passages 29 are formed in the sleeve 18 to set up communication between the chamber 23 and the interior of the sleeve 18. These passages 29 are designed to have fluid pass therethrough.

Another valve member 30 is positioned to slide in the bushing 31 and this valve member 30 is formed with a head 32 which is in abutting engagement with the head 28 of the valve member 26. The valve member 30 carries a tip 33 which, like the needle tip 27, will be made of some harder non-corrodible material and this tip 33 will be independent of the member 30, but carried thereby by being received in the seat formed in this valve member. As illustrated in the drawing, the tip 33 is shown as preferably defined by a hemisphere.

From the foregoing, it is apparent that there is provided, the valve members 26 and 30, which include valve tips, and which members are assembled in the sleeve 18 and bushing 31 to provide for the seating and unseating of the needle tip 27 in the valve seat 17. Movement of the valve member 30 is effective to seat or unseat the tip 33 from the valve seat which is present in the structure now to be described.

The housing 10 is formed with an annular shoulder at 34 against which bears a flange 35 which is formed on a tubular member 36 and which is maintained in this abutting position by a threaded ring 37. Cooperating with the tubular member 36 is a telescopic member 38 which is formed with the flanges 39, which engages the interior of the sleeve 36. This sleeve 36 is also formed with a flange at its lower end and a packing (not shown) may be positioned in this space defined by these flanges in the sleeve 36 and telescopic member 38. The telescopic member 38 is formed at one end with a head 40 which is provided with an opening 41 which constitutes a valve seat.

This valve seat 41 is preferably of a ring-like shape which conforms in curvature to the tip 33 so as to provide for a surface contact between the valve tip 33 and its seat 41. A bleed groove is shown at 42 as being formed in the seat 41. This groove provides for the passage of a small amount of fluid even though the valve tip 33 be in sealing position.

A spring 43 is positioned within the telescopic member 38 and has one end engaging the head 40. The other end of the spring 43 engages a follower 44 which is maintained in position by a screw member 45. This screw member 45 extends upwardly through a closure 46 that is threaded in the housing 10. The screw member 45 has a head 47 that ordinarily may be protected by a cap 48.

A by-pass port is shown at 49 as communicating with the interior of the housing 10. Fluid ordinarily will be conveyed from the by-pass port 49 back to the source of supply of the fluid.

In operation, fluid under pressure is admitted at the port 11 and fills the chamber 22, from which it passes through the passages 21 into the chamber 23. As pressure is built-up in the chamber 22, the spring 43 is affected to raise the telescopic member 38. At the same time, the spring 25 will raise the assembly of valve members 26 and 30 so that the valve seat 41 is closed, while that at 17 is open, so that the fluid will pass out through the port 15. When pressure has been built-up to a certain point, the flanged head 32 on the valve member 30 engages the bushing 31 to interrupt its upward movement, so that further upward movement of the telescopic member 38 under the built-up pressure will open the valve seat 41 and permit the excess fluid to be by-passed back to the port 49.

While a preferred specific embodiment of the invention is hereinbefore set forth, it is to be understood that I am not to be limited to the exact constructions illustrated and described, because various modifications of these details may be provided in putting the invention into practice within the purview of the appended claims.

I claim:—

1. In a relief valve of the character described, a sleeve, a bushing carried by the sleeve, a valve member slidable in said sleeve, and a valve member carried by said bushing and slidable therein, said valve members being in abutting engagement and having valve tips at their ends which are remote from the abutting engagement.

2. In a relief valve of the character described, a sleeve, a bushing carried by the sleeve, a valve member in said sleeve, a valve member carried by said bushing, said valve members being in abutting engagement, a valve tip on each of the valve members at the end remote from the abutting engagement, means for maintaining the valve members in abutting engagement, and means for limiting the movement of the valve member carried by the bushing.

3. In a valve structure of the character described, the combination with a sleeve of a valve member movably mounted in said sleeve, said valve member having a needle tip positioned exteriorly of the sleeve and a head at the end opposite to the end carrying the tip, a spring interposed between the sleeve and head, and a second valve member having a head in abutting engagement with the head of said first mentioned valve member.

4. In a valve structure of the character described, the combination with a valve sleeve and a valve member movable therein of a bushing carried by the sleeve, and a valve member movable in said bushing, said last mentioned valve member having a valve tip at one end and a head at the other, said head being in engagement with the first mentioned valve member.

WALTER CZARNECKI.